2,997,759
SHELL MOLDING MIXTURE

Charles F. Froberger, Oak Park, Mich., assignor to General Motors Corporation, Detroit, Mich., a corporation of Delaware
No Drawing. Filed Nov. 17, 1955, Ser. No. 547,571
9 Claims. (Cl. 22—193)

This invention relates to shell molding and particularly to an inexpensive shell molding mix which may be used to form shell molds without excessive residue build-up on pattern surfaces.

As is well known, the shell molding process involves the formation and use of thin-walled dispensable molds and cores composed of sand and resinous binders. This process can be used to produce precision castings in a wide variety of metals.

Essentially the shell molding process consists of using a heat-hardenable plastic or resin as a binder for the grains of sand or other refractory material to form rigid molds having high gas permeability, good surface smoothness and dimensional stability. The molding material, which is generally a mixture of a major proportion of silica sand and a minor proportion of thermosetting resin binder, is normally used in dry form with no water being added. For some applications it is desirable to coat the sand particles with the resin before application to the pattern, while in other instances the resin is merely mixed with the sand in powdered form. Phenol-formaldehyde, phenol-furfural, melamine-formaldehyde and urea-formaldehyde are typical examples of the type of thermosetting binders preferably used.

It is desirable to use sand which is free of metal oxides, clay, moisture and organic matter. Silica flour or other finely comminuted refractory facing materials also may be included in the molding mix to provide the molds with exceptionally smooth working surfaces.

These sand-resin molds are prepared by allowing the sand and resin to come into contact with a hot pattern for a short period of time. A generally uniform layer of the mix adheres to the pattern surfaces due to the melting of the resin which bonds the sand with which it is intimately mixed, thereby accurately reproducing pattern details. The half patterns, gates and runners usually are permanently fixed on metal plates. Metal patterns normally must be used because they are subjected to elevated temperatures. Pattern temperatures between 350° F. and 500° F. are typical, but temperatures as low as 250° F. or lower and as high as 700° F. or even higher may be advantageously employed under particular conditions.

The pattern temperature, the characteristics of the resin and sand used, and the length of time the molding material is allowed to remain in contact with the hot pattern determine the thickness of the mold. Mold build-up times generally range from a few seconds to approximately one minute, depending on the particular application. After this short time interval any excess or unbonded sand and resin are removed, and the closely adhering sand-resin layer is preferably cured while in contact with the pattern by subjecting it to a temperature within the range of approximately 300° F. to 1500° F. The curing or baking time is relatively short, usually from a few seconds to approximately five minutes. This curing operation results in the conversion of the resinous material to a hard, insoluble binder which securely bonds the sand grains together. After curing of the mold, it is stripped from the pattern and is ready for use. The formed molds are, in effect, thin shells which have sufficient strength and stiffness to make them suitable for many casting operations.

The relatively high cost of the organic binder is one of the primary reasons why the shell molding process is not used more extensively at the present time. Inasmuch as the sand-resin molding mix normally contains up to about 15% by weight of a thermosetting resin binder, the cost of the binder has been a substantial item of expense when this process is employed. This is particularly true in applications which require the inclusion of a finely comminuted refractory material, such as silica flour or powdered spent catalyst material, in the molding mix since such a mixture necessitates the use of a relatively large amount of binder. The employment of a mix containing a fine refractory material is especially desirable in casting steel or other high melting metals by the shell molding process.

Conventionally a powdered thermosetting resin and a small amount of curing agent are mixed with the desired quantity of a suitable refractory filler material, and the dry mixture is dumped or blown onto the hot pattern without further preparation. Although the use of such a molding mix generally provides satisfactory shell molds in most respects, it is not only expensive but it also frequently produces undesirable residue build-up on some types of patterns. Moreover, many of the shell molds heretofore used have proved to be somewhat brittle and not sufficiently strong or resilient to produce optimum results in all instances.

Accordingly, a principal object of the present invention is to provide an improved shell mold and a method of forming the same so as not to produce an appreciable amount of pattern build-up. The elimination of this build-up or residue in turn permits the same pattern to be reused over a greatly extended period of time without the necessity of removing the residue therefrom in order to accurately reproduce pattern details. A further object of my invention is to provide an improved shell molding mix containing an organic binder which is appreciably less expensive than those generally heretofore used. A still further object of this invention is to provide a process for forming shell molds in which the amount of the relatively costly thermosetting resin binder may be substantially reduced, amounts in the order of approximately 2% by weight being all that is required for many applications.

These and other objects are attained in accordance with my invention by the use of a shell molding mix having a binder comprising a blend of novolak and the reaction product of furfural and a thermoplastic lignin-type resinous material derived from wood and containing both methoxyl and hydroxyl groups, hereinafter referred to as "lignin-type resin." The binder may be either merely mixed with the sand or other suitable comminuted refractory material or the latter may have a substantial portion of its particles coated with the binder. In either event the resultant mix forms inexpensive shell molds without building up a residue layer on the pattern. A small amount of curing agent or accelerator also is added to the molding mix to promote proper setting of the binder upon subsequent contact of the molding mix with the hot pattern.

The novolak provides the mold with smooth casting-defining surfaces and high strength, while the lignin-type resin is employed as a co-polymerizable substance to provide improved binding of the sand particles, as well as to improve the strength of the mold. The furfural functions as a binding agent, and its presence appears to reduce the amount of residue build-up on the pattern.

As indicated above, the term "lignin-type resin," as used herein, is intended to include various wood derivative resinous materials in which the molecules contain both methoxyl and hydroxyl groups. Such materials may be obtained from a variety of wood products including sawdust, wood chips, etc., by physical and/or chemical treatment. Illustrative of one type of thermoplastic resinous material is a substantially gasoline-insoluble resinous material obtained by extracting a resinous wood with a coal tar hydrocarbon, removing said hydrocarbon by evaporation, leaving a residue comprising a mixture of wood rosin and thermoplastic resinous material, extracting the rosin with a petroleum hydrocarbon, leaving a thermoplastic resinous material, frequently referred to as a gasoline-insoluble wood resin. Such a material is currently available commercially as "Vinsol" resin, a product of the Hercules Powder Company.

It also will be understood that the term "mold," as used herein, is applied in its generic sense to mean a casting from which includes both molds and bores, this invention not being limited to the former. Similarly, the word "pattern" is used herein as including both mold patterns and core boxes.

In preparing the binder the lignin-type resin, which is a solid at room temperature, and the liquid furfural are first mixed and co-reacted. It is preferable to heat this mixture to a proper reaction temperature in order to expedite the process since the furfural functions as a solvent for the lignin-type resin. A temperature in the range of 200° C. to 300° C. is normally satisfactory although a temperature of at least 240° C. is preferred. The reaction product thus produced solidifies upon cooling, and is thereafter thoroughly mixed with the novolak and/or resole either by means of solid fusion or solvent blending.

When solid fusion is used, the lignin-type resin-furfural reaction product is remelted, preferably at a temperature of about 150° C. and the novolak is added to it. The lignin-type resin-furfural reaction product melts and dissolves the novolak powder. The resultant solution is then permitted to cool to room temperature and solidify. It is subsequently pulverized to convenient size and thoroughly mixed with the dry molding sand. A small but effective amount of the accelerator or co-condensating agent, such as hexamethylenetetramine or paraformaldehyde, is added to the molding mix before it is mixed with the sand or during this mixing operation. This accelerator promotes curing of the principal binder constituents when the molding mix is later placed in contact with the hot pattern. Alternatively, the binder may be blended with the sand while still in a molten condition to effectively pre-coat the surfaces of the individual sand grains. If this latter method is used, the accelerator should not be added to the other liquid binder constituents until they are about to be mixed with the sand or are actually being mixed with it.

Also a highly satisfactory shell molding mix may be formed by a procedure involving initially dissolving the novolak in a suitable solvent, such as methyl-ethyl ketone or a mixture of methyl alcohol and toluene. After the novolak is dissolved in the solvent, the lignin-type resin-furfural reaction product is added to the solution and also dissolved therein. Normally only as much solvent is used as is necessary to dissolve these constituents. In practice, when a sufficient amount of the lignin-type resin-furfural reaction product has been added so that this material and the novolak constitute at least approximately 80% by weight of the total mixture or solution, the blend of these constituents is heated to a temperature at which it flows freely before it is mixed with the sand. Generally a temperature of between about 150° F. and the boiling point of the solvent is therefore desirable. Of course, the solvent and the binder constituents may be initially heated and maintained at this elevated temperature while the latter are being dissolved in the solvent. In either event a portion of the solvent is thereafter evaporated, and the residue is mixed with the sand as a viscous liquid by means of suitable mulling equipment.

When the sand is to be pre-coated by the binder, the former also is preferably heated to prevent the binder constituents from cooling too rapidly and to insure proper distribution of the binder on the sand grains. Hence, I have found it advisable to heat the sand to a temperature of approximately 600° F. and then to permit the sand to cool to approximately 400° F. before the binder-solvent is introduced. In general, satisfactory results are provided if the temperature of the sand is between 300° F. and 500° F. when the binder is added. During the mulling operation in which the binder is completely blended with the sand, the mixture cools and the solvent evaporates, leaving a coating of the binder on the sand particles.

When the temperature of the coated sand has dropped to a temperature which is sufficiently low to preclude setting or curing of the binder upon addition of the curing agent, the latter is added to the molding mix. I have found a temperature between approximately 100° F. and 150° F. to be satisfactory in this respect. Likewise, the molding mix may be easily mulled at this temperature. The mulling operation is continued, of course, until the curing agent is thoroughly mixed with the coated sand grains.

Although excellent results are obtained using the above-described procedure, the sand particles may be pre-coated without using a solvent. If the sand is maintained at a sufficiently high temperature, it is possible to add the powdered binder directly to the hot sand and to use the heat in the sand to melt and distribute the binder. The flow characteristics of the binder are such as to permit satisfactory coating of the sand particles under these conditions. For example, the solvent may be omitted and the novolak and lignin-type resin-furfural reaction product can be melted together, or separately melted and blended. This binder mixture then may be permitted to cool and crushed to a powder form before being added directly to the hot sand. Likewise, it is also possible to separately or simultaneously mix the novolak and lignin-type resin-furfural co-reactant with the hot sand in powder form, or these two powders may be pre-mixed and then thoroughly blended with the sand which is maintained at the aforementioned elevated temperatures. Alternatively, the novolak and the lignin-type resin-furfural reaction product can be melted and added, either simultaneously or successively, to the heated sand while in liquid form. If desired, of course, these liquid binder constituents may be blended together, either as liquids or powders, before being introduced to the sand as a hot liquid.

To obtain satisfactory results the lignin-type resin-furfural reaction product should consist essentially of 85% to 99% by weight of the lignin-type resin and a small but effective amount not in excess of about 7% by weight of reacted furfural. For optimum results it is preferred to use approximately 89% to 95% lignin-type resin and about 4% to 5% reacted furfural, although the latter is useful in amounts as low as 1% by weight. Normally the mixture also contains a certain amount of unreacted furfural, quantities in the order of 4% to 5% being typical. Hence, it will be seen that the lignin-type resin-furfural co-reactant frequently contains 8% to 10% furfural, about one-half of which reacts. Usually it is desirable to keep the amount of unreacted furfural at a minimum because if to much is present there is produced a soft binder material which cannot be conveniently pulverized. However, if the resinous binder is used to pre-coat sands the amount of the unreacted furfural is not of great importance except insofar as it increases the cost of the molding mix.

It is undesirable to use a binder containing more than about 7% reacted furfural not only for reasons of economy but also because the resinous binder will not flow properly on shell mold patterns at practical operating temperatures if it contains more than this amount of reacted furfural. However, at least 1% reactive furfural is preferred since it apparently reacts with low melting constituents in the latter. It is advantageous to have these low melting constituents react with the furfural to the greatest extent possible because they otherwise would carbonize on the patterns and cause pattern build-up.

I have found that, in order to properly benefit from the present invention, the lignin-type resin-furfural reaction product should constitute at least 25% by weight of the binder. Greater amounts, in some cases up to about 70% by weight also may be used. In the formation of shell molds suitable for many casting operations I have found that superior results are obtained if the binder contains about 35% to 55% by weight of this material, approximately 40% by weight being preferred at present.

Normally the curing agent should not be present in an amount greater than approximately 25% of the total weight of the binder. If an excess of the curing agent is employed, thermal stresses are set up in the mold on pouring of the molten casting metal and cracking of the mold occurs. Hence it is preferred to add the curing agent in amounts between approximately 8% and 18% of the weight of the binder.

Certain of the resoles may be included in the binder as a substitute for a portion or all of the novolak, provided they can be conveniently melted without setting. Generally, however, it is preferred to use only a small percentage of resole in place of novolak and satisfactory results are obtained when resole is omitted entirely. In all instances, of course, it is necessary that the binder mixture sets, at least partially, at the temperature of the hot pattern.

In practice, the amount of the organic binder to be used in a particular shell molding operation may be varied, although in general it is desirable to employ a relatively small amount of binder to reduce the cost of the molds. When employing organic binders of the present invention I have found that in many cases as little as approximately 2% by weight of the total binder may be used. The maximum amount of binder to be employed generally is determined by cost considerations, although in most cases superior results are obtained if the amount of the binder is not permitted to exceed about 15% of the total weight of the molding mix. Hence, in order to obtain satisfactory casting at a reasonable cost, a binder content between 3% and 7% is preferred.

Ordinary sand or other comminuted refractory filler materials, such as zirconium silicate sands and flours, are appropriate for use in practicing the present invention and normally constitute between 85% and 98% of the weight of the molding mix. In most cases it is desirable to employ a refractory material having an American Foundryman's Society fineness number within the range of about 25 to 180. At present I prefer to use a refractory material having an AFS fineness number of 80 to 125.

In some instances it is desirable to also employ fine refractory materials or powders, such as silica flour or powdered spent catalyst, etc. as fines to provide a better mold facing surface. In practice, amounts of such facing materials within the range of about 2% to 20% by weight are used in many cases to provide a more heat-resistant mold surface. Thus steel can be successfully cast in a shell mold formed from a mixture consisting essentially of about 75% to 95% by weight of dry sand, 2% to 20% by weight of silica flour or other finely divided refractory material, and 5% to 15% by weight of the organic binder.

After the shell molding mix has been prepared in the foregoing manner, it is placed in contact with the surface of a heated pattern having a temperature of at least approximately 350° F. At temperatures below about 350° F. the lignin-type resin will not melt or flow to a sufficient extent to be of any value in strengthening the mold. To obtain the proper resin flow, the mold mixture should remain in contact with the heated pattern surface for at least 10 seconds, a contact time of 20 to 35 seconds at the above pattern temperature usually providing highly satisfactory results.

During the formation of a shell mold according to the present invention, an improved casting-defining molding surface results from the the co-condensation or copolymerization of the novolak and the lignin-type resin-furfural reaction product to form a substantially completed thermoset product. The novolak preferably is partially polymerized when mixed with the other binder constituents so that only a short baking period is required to cure the binder.

The subsequent curing or baking time in most cases chould be between about 30 and 120 seconds, a 40 to 90 second cure normally providing optimum results. Of course, the length of the curing period depends on the temperature, the higher the curing temperature the shorter the curing time, and vice versa. Curing temperatures between 350° F. and 1500° F. have proved to be satisfactory although in some instances temperatures as high as 1800° F. may be employed. The curing or hardening of the binder is caused by copolymerization of the novolak and the lignin-type resin-furfural reaction product with the aid of the included small amount of curing agent.

The sand-resin shell-type molds thus produced have excellent permeability, possess high transverse strength and exhibit no tendency to cause blowing on the castings when the molten metal is poured. Moreover, such molds offer very little resistance to the expansion and contraction of the molten metal subsequent to pouring, thus minimizing the danger of formation of cracks or hot tears.

On pouring the liquid metal into the mold or core cavity in the usual way, the hot metal, on coming into contact with the mold or core, burns the plastic binder to essentially carbon. The gases which are generated readily escape through the highly permeable sand-resin shell. As a result of this binder breakdown, the shake-out is easily accomplished.

While the invention has been described by means of certain specific examples, it is to be understood that the scope of the invention is not to be limited thereby except as defined in the following claims.

I claim:

1. A molding material for forming shell molds, said molding material consisting essentially of a major proportion of a comminuted refractory filler and a minor proportion of an organic binder containing 25% to 75% by weight of the reaction product of furfural and a thermoplastic resinous material derived from wood and containing both methoxyl and hydroxyl groups, a small but effective amount not in excess of 25% by weight of binder curing agent, and the balance substantially all novolak.

2. A molding material for forming shell molds without pattern build-up, said molding material comprising 2% to 15% by weight of organic binder and 85% to 98% by weight of sand, said binder consisting essentially of 8% to 18% by weight of binder curing agent, 25% to 75% by weight of the reaction product of furfural and a thermoplastic lignin-type resinous material derived from wood and containing both methoxyl and hydroxyl groups, and the balance substantially all novolak.

3. A molding material for forming shell molds without residue build-up on pattern surfaces, said molding material consisting essentially of 2% to 15% by weight of heat-hardenable organic binder and the balance substantially all sand, said binder comprising 35% to 55% by weight of the reaction product of furfural and a lignin-type resin derived from wood and containing both methoxyl and hydroxyl groups, a small but effective amount not in excess of 25% by weight of curing agent and the balance substantially all at least one member selected from the class consisting of novolak and resole, said reaction product containing 85% to 99% by weight of said lignin-type resin and a small but effective amount not in excess of approximately 7% by weight of reacted furfural.

4. A dry sand-resin molding mix for application to a heated pattern to form a smooth-surfaced shell mold without building up a residue layer on said pattern, said molding mix consisting essentially of 3% to 7% by weight of heat-hardenable organic binder and 85% to 98% by weight of sand, said binder comprising 35% to 55% by weight of the reaction product of furfural and a thermoplastic lignin-type resinous material derived from wood and containing both methoxyl and hydroxyl groups, 8% to 18% by weight of binder curing agent, and the balance substantially all novolak, said reaction product being formed by mixing at an elevated temperature 89% to 95% by weight of said resinous material with 1% to 7% by weight of reactive furfural.

5. An inexpensive sand-resin shell mold formed by applying to a pattern heated to a temperature of at least 350° F., a molding mixture comprising sand and a heat-hardenable organic binder, said binder consisting essentially of a small but effective amount not in excess of 25% by weight of binder curing agent, 25% to 75% by weight of the product resulting from reacting at an elevated temperature 1% to 7% by weight of reactive furfural with 85% to 99% by weight of a thermoplastic lignin-type resinous material derived from wood and containing both methoxyl and hydroxyl groups, and the balance susbtantially all at least one member of the class consisting of novolak and resole.

6. A method of forming an inexpensive smooth-surfaced shell mold which comprises placing into contact with a pattern heated to a temperature of at least 350° F. a molding mixture consisting essentially of a minor proportion of heat-hardenable organic binder and a major proportion of comminuted refractory material so that said binder successively melts and solidifies to bond a substantial portion of the sand particles together into an adherent layer on the surface of said pattern, said binder comprising a small but effective amount not in excess of 25% by weight of binder curing agent, 25% to 75% by weight of the reaction product of furfural and a lignin-type resin derived from wood and containing both methoxyl and hydroxyl groups, and the balance substantially all novolak, thereafter curing the formed mold shell and removing it from the pattern surface.

7. A process for forming a smooth-surfaced shell mold without appreciable residue build-up on pattern surfaces, said process comprising mixing novolak and a binder curing agent with the reaction product of furfural and a thermoplastic resinous material derived from wood and containing both methoxyl and hydroxyl groups in proportions wherein said reaction product and said curing agent constitute 25% to 75% and 8% to 18%, respectively, of the weight of the binder, adding the heat-hardenable binder so formed to sand in an amount so that said binder constitutes 2% to 15% of the resultant mix, placing said mix into contact with a pattern which has been heated to a temperature of at least 350° F. to bond a substantial portion of the sand particles together, and thereafter curing the formed shell mold by heating for 30 to 120 seconds while in contact with the pattern at a temperature between 350° F. and 1500° F.

8. A method of forming a molding mixture to be applied to a hot pattern for forming a shell mold, said method comprising mixing furfural with a thermoplastic lignin-type resinous material derived from wood and containing both methoxyl and hydroxyl groups in amounts such that the lignin-type resinous material constitutes 89% to 95% by weight and reactive furfural constitutes 1% to 7% by weight, heating said constituents at an elevated temperature to cause said resinous material and said furfural to react, mixing the resultant reaction product with novolak and a binder curing agent in proportions such that said reaction product and said curing agent constitute 25% to 75% by weight and 8% to 18% by weight, respectively, of the heat-hardenable binder thus formed, with the balance being susbtantially all novolak, adding said heat-hardenable binder to sand in a quantity sufficient to produce a molding mixture containing 2% to 15% by weight of said binder.

9. A method of forming a thin-walled shell mold which comprises applying to a metal pattern which is heated to a temperature of at least 350° F. a molding mixture consisting essentially of about 85% to 98% by weight of sand and about 3% to 7% by weight of heat-hardenable organic binder, said binder consisting essentially of approximately 35% to 55% by weight of the reaction product of furfural and a thermoplastic alkali lignin resin derived from wood and containing both methoxyl and hydroxyl groups, 8% to 18% by weight of binder curing agent, and the balance substantially all novolak, said reaction product being formed by mixing at an elevated temperature 89% to 95% by weight of said alkali lignin resin and 1% to 7% by weight of reactive furfural, said alkali lignin resin being obtained from wood by precipitating spent soda pulp liquor, filtering the precipitate, neutralizing any remaining liquor and drying the resulting paste to form an alkali lignin resin.

References Cited in the file of this patent

UNITED STATES PATENTS

| | | |
|---|---|---|
| 2,101,330 | De Laney | Dec. 7, 1937 |
| 2,141,043 | Maters | Dec. 20, 1938 |
| 2,683,296 | Drumm et al. | July 13, 1954 |
| 2,706,188 | Fitko et al. | Apr. 12, 1955 |